United States Patent
Abuelsaad et al.

(10) Patent No.: US 9,202,078 B2
(45) Date of Patent: Dec. 1, 2015

(54) DATA PERTURBATION AND ANONYMIZATION USING ONE WAY HASH

(75) Inventors: Tamer E. Abuelsaad, Poughkeepsie, NY (US); Carlos Hoyos, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 13/117,436

(22) Filed: May 27, 2011

(65) Prior Publication Data

US 2012/0303616 A1    Nov. 29, 2012

(51) Int. Cl.
  G06F 7/00     (2006.01)
  G06F 17/30    (2006.01)
  G06F 21/62    (2013.01)
  G06F 17/00    (2006.01)

(52) U.S. Cl.
  CPC ...... *G06F 21/6227* (2013.01); *G06F 17/30076* (2013.01); *G06F 17/30082* (2013.01); *G06F 17/30085* (2013.01); *G06F 21/6254* (2013.01)

(58) Field of Classification Search
  CPC ............... G06F 17/30076; G06F 17/30085; G06F 17/30082
  USPC ....................... 707/736, 740, 747
  See application file for complete search history.

(56) References Cited

U.S. PATENT DOCUMENTS

| | | | |
|---|---|---|---|
| 6,397,224 B1 * | 5/2002 | Zubeldia et al. | 707/999.101 |
| 6,636,875 B1 | 10/2003 | Bashant et al. | |
| 7,724,918 B2 | 5/2010 | Balakrishnan et al. | |
| 7,823,207 B2 | 10/2010 | Evenhaim | |
| 7,929,689 B2 | 4/2011 | Huitema et al. | |
| 2001/0054155 A1 * | 12/2001 | Hagan et al. | 713/193 |
| 2004/0034550 A1 * | 2/2004 | Menschik et al. | 705/3 |
| 2004/0078238 A1 * | 4/2004 | Thomas et al. | 705/3 |
| 2005/0060556 A1 | 3/2005 | Jonas | |
| 2005/0256740 A1 * | 11/2005 | Kohan et al. | 705/2 |
| 2006/0218391 A1 * | 9/2006 | Glazer et al. | 713/152 |
| 2007/0055482 A1 | 3/2007 | Goodermote et al. | |
| 2007/0239982 A1 | 10/2007 | Aggarwal et al. | |
| 2010/0153738 A1 | 6/2010 | Jonas | |
| 2010/0262836 A1 | 10/2010 | Peukert et al. | |
| 2011/0010563 A1 | 1/2011 | Lee et al. | |
| 2011/0093327 A1 | 4/2011 | Foodyce, III et al. | |

OTHER PUBLICATIONS

Notification of Transmittal of the International Search Report and the Written Opinion of the International Searching Authority, or the Declaration, PCT Application No. PCT/US2012/0396636, dated Aug. 16, 2012.

(Continued)

*Primary Examiner* — Kannan Shanmugasundaram
(74) *Attorney, Agent, or Firm* — Cahn & Samuels, LLP

(57) ABSTRACT

An embodiment of the invention provides a method for anonymizing data from multiple data sources according to an embodiment of the invention. The data sources include record identifiers identifying entities associated with the data, wherein the record identifiers are only stored by the data sources. The data is collected by a central data aggregation module connected to the data sources. A record identifier is received by an anonymization engine from a first data source; and, a first anonymous identifier is generated with the anonymization engine to replace the record identifier. A map is sent to a mapping module if the anonymization engine has anonymized the record identifier before, wherein the map includes a list of anonymous identifiers that have been used to replace the record identifier. The first anonymous identifier and first data associated with the first anonymous identifier are sent to the data aggregation module.

17 Claims, 7 Drawing Sheets

(56) References Cited

OTHER PUBLICATIONS

IBM, "Method for Anonymous Collection and Assessment of Information," Nov. 5, 2004, IP.com No. IPCOM000032479D.

"Anonymous Bioinformatics Exchange," Jan. 18, 2008, IP.com No. IPCOM000166615D.

Kumar, Ravi, et al., "On Anonymizing Query Logs via Token-based Hashing," WWW 2007 / Track: Security, Privacy, Reliability, and Ethics, pp. 629-638.

* cited by examiner ically used jointly) that identifies an individual or a group. The user identifier might be a name, a social security number, a phone number, an address, an IP address, or any variable that identifies an individual or a group.

DATA PERTURBATION AND ANONYMIZATION USING ONE WAY HASH

BACKGROUND

The present invention is in the field of systems, methods, and computer program products for data perturbation and anonymization using one-way hash.

Anonymizing data relies on removing or modifying the identifying variable(s) contained in the data, also known as Personally Identifiable Information (PII). Typically, an identifying variable is one that describes a characteristic of a person that is observable, that is registered (identification numbers, such as, social security number, employee ID, patient ID, etc.), or generally, that can be known to other persons. Anonymizing data keeps the referenced person's privacy as a priority while giving attention to a data miner's needs (e.g., an analyst examining the data for identification of trends, patterns, etc.).

Aggregating employee records to allow for data mining (e.g., identifying common patterns of top performers based on employee ratings) links all employee records across an organization. Moreover, data is often shared between organizations with data mining companies (e.g., surveyors, researchers, analysts, etc.). Anonymizing prevents the data miner from identifying the employees referenced in a data set.

SUMMARY OF THE INVENTION

An embodiment of the invention provides a method and system for anonymizing data from multiple data sources according to an embodiment of the invention. The data sources include record identifiers identifying entities associated with the data, wherein the record identifiers are only stored by the data sources. The data is collected by a central data aggregation module connected to the data sources. A record identifier is received by an anonymization engine from a first data source; and, a first anonymous identifier is generated with the anonymization engine to replace the record identifier. A map is sent to a mapping module if the anonymization engine has anonymized the record identifier before, wherein the map includes a list of anonymous identifiers that have been used to replace the record identifier. The map is stored in a storage device if the anonymization engine has not anonymized the record identifier before. The first anonymous identifier and first data associated with the first anonymous identifier are sent to the data aggregation module.

The record identifier is received by the anonymization engine from a second data source; and, a second anonymous identifier is generated with the anonymization engine to replace the record identifier. An updated map is sent to the mapping module, wherein the updated map includes an updated list of anonymous identifiers that have been used to replace the record identifier. The second anonymous identifier and second data associated with the second anonymous identifier are sent to the data aggregation module.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides a method of anonymization and aggregation using a one-way non-reversible hash that protects the privacy of a data owner (also referred to herein as the "individual" or "user") by enabling traceability to the data owner while concealing the identity of the data owner. The method also records a mismatch when data is contributed from more than one silo (also referred to herein as a "data source"), such as a patient's records from a hospital (i.e., silo 1) or from a doctor (i.e., silo 2).

At least one embodiment of the invention includes a data anonymizer (also referred to herein as an "anonymization engine") that creates the one-way hash. A one-way hash prevents reverse engineering of the data with the purpose of exposing the data owner's privacy. The one-way hash includes 2 inputs: a salt (i.e., a group of random bits) and a key. If the data is a target of brute force or dictionary attacks, the embodiments herein employ an ever changing salt and key combination.

A data collector/aggregator (also referred to herein as the "data aggregation module") has no view of the data anonymizer. This allows aggregation of a person's private data without exposing their identity. In at least one embodiment, an independent third entity is used to reconcile hashes created from different sources or salts. Separating the hashing, mapping and reporting functions ensures that no one party, if compromised, can disclose all the user information. If any single entity of the annonymization platform is attacked, the attacker will not be able to identify the data owner. Any data kept by the data anonymizer is not enough for reverse engineering.

Figure 1:
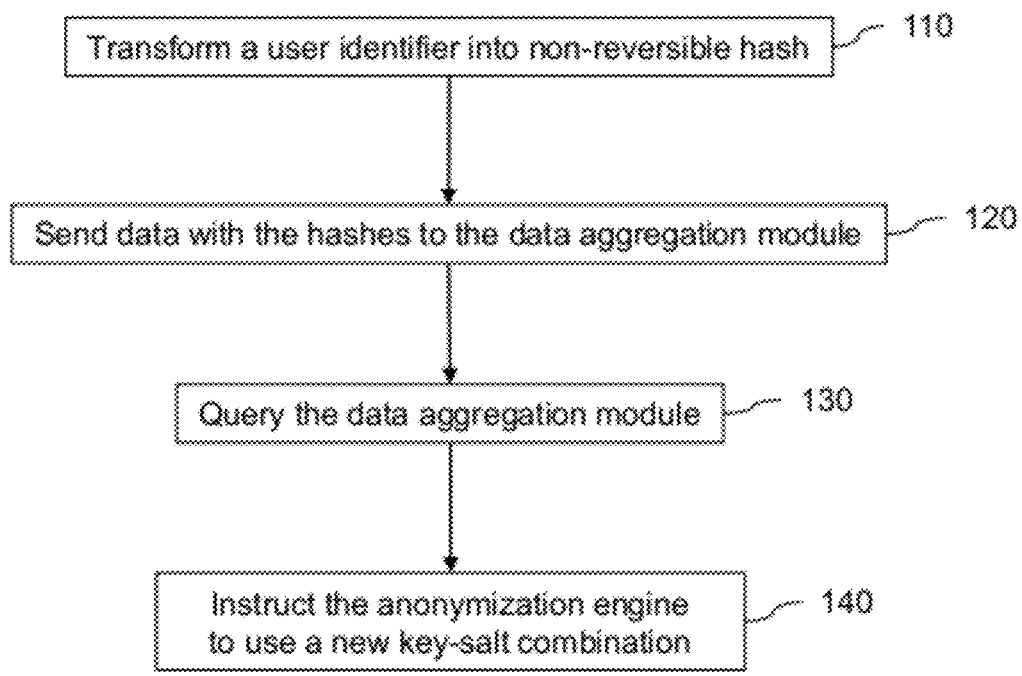
FIG. 1 is a flow diagram illustrating a method of anonymizing data coming from multiple silos according to an embodiment of the invention.

FIG. 1 is a flow diagram illustrating a method of anonymizing data coming from multiple silos according to an embodiment of the invention. The method allows for a data collector to run reports and analysis, and match multiple silos, without being able to match data back to users. In at least one embodiment, the user is a group of individuals, an organization, or a corporate entity.

Each silo transforms a user identifier (also referred to herein as a "personal identifier") into a unique, non-reversible hash (also referred to herein as an "anonymous identifier") 110. Each silo has a user identifier (or collection of identifiers) that defines a user. The user identifier is associated to additional (often private) data for the user that only the silo knows for privacy reasons. The user identifier directly identifies the user (e.g., the user's name) or indirectly identifies the user by allowing someone to use the user identifier to track back to the user's identity (e.g., social security number, employee ID, patient ID, e-mail address). Conversely, the anonymous identifier (e.g., a random string of letters and/or numbers) masks the identity of the user. For example, in one embodiment, the user identifier is "Jane Doe" and the anonymous identifier is "AKZ76TV33".

The silo replaces any personal information with a unique hash that makes the data unique to its owner, but that cannot be tracked back to him or her. To do this, the silo sends the user identifier to an anonymization engine external to the silo. For example, the silo asks the anonymization engine to anonymize the string "jdoe", which represents a user in it's system. The string "jdoe" can be composed of multiple record/entry identifiers, such as email address plus social security number plus last name, etc.

In at least one embodiment of the invention, the anonymization engine stores a set of secrets (also referred to herein as "key-salt combinations") used to generate one-way hashes for anonymizing the user identifiers common across silos. First, the anonymization engine checks in its key-salt table and pulls the most recent key and salt for the requesting silo. The anonymization engine then generates the anonymized hash for the requested user identifier. This is done by applying a one-way hash function (e.g. md5, sha2 . . . ). For example, if the current (salt, key) for the silo is (water, 1002), and the user identifier is jdoe, then:

---
hash(<user identifier> + <current_silo_salt>) + <delimiter> + <key>
hash('jdoe' + 'water') + '#' + '1002'
jklmop==#1002
---

The anonymization engine checks to see if this user identifier had been anonymized in the past with this salt by looking if the hash is in the key-hash bucket for this key (the user identifier is not stored, just a hash that is a product of a one-way hash). If it has not, the anonymization engine generates all the previous hashes using all the different salts for all silos, and sends current and previous hashes to an agent. This is a one time operation where the anonymization engine keeps a list of all hashes that have been synchronized, so that in later passes, this anonymized hash will not be sent to the agent.

In at least one embodiment, the agent can be queried to map hashes generated with current and older key-salts. The anonymization engine checks its synchronized hashes bucket to see if the anonymized hash is present. If the anonymized hash is present, the anonymization engine goes to the last step. If the anonymized hash is not present in the synchronized hashes bucket, then this is the first time that this user identifier has been anonymized with the current key-salt for this silo. Since there are older key-salts that could have been used to anonymize this user identifier, the anonymization engine creates a list of "equivalent hashes" to send to the agent. The anonymization engine takes the user identifier and anonymizes it with the previous key-salts. This creates an equivalent hashes table for this user identifier, which is sent to the agent. After the agent receives the table, the current hash is added to the synchronized hashes bucket. Adding it to the synchronized hashes bucket makes this synchronization operation a one time operation between the agent and the anonymization engine for each user identifier. The anonymization engine then returns the anonymized hash to the silo. Additional levels of encryption can be added to the anonymized hashes.

Each silo sends their data with the anonymized hashes to the data aggregation module 120. The data aggregation module correlates the data received from multiple silos that is related to the same user (same entity).

In at least one embodiment of the invention, the data aggregation module is queried 130. In one embodiment, limitations are placed on analysts querying the data aggregation module in order to prevent query narrow down. Querying limitations can include, for example, the number of resulting rows, the number of columns requested, etc. The querying limitations prevent analysts from tracing records to their owners.

In at least one embodiment of the invention, the anonymization engine is instructed to use a new key-salt combination (also referred to herein as a "secret") 140. The secret can be changed on a regular time interval or when there is a concern that the current secret has been compromised. When the anonymization engine receives the message to change the key-salt combination, it creates a new secret, following secret policies (e.g., length of time before the secret expires, whether the secret can be reused, etc.).

The anonymization engine changes the key and/or the salt. For example, in at least one embodiment, the anonymization engine creates a new key different from any previously used keys (could be as simple as adding a value of 1 to the last key or more complex), adds the new key-salt combination to the key-salt table, and sets it as the current secret. Finally, the anonymization engine clears the synchronized hashes bucket.

Figure 2:
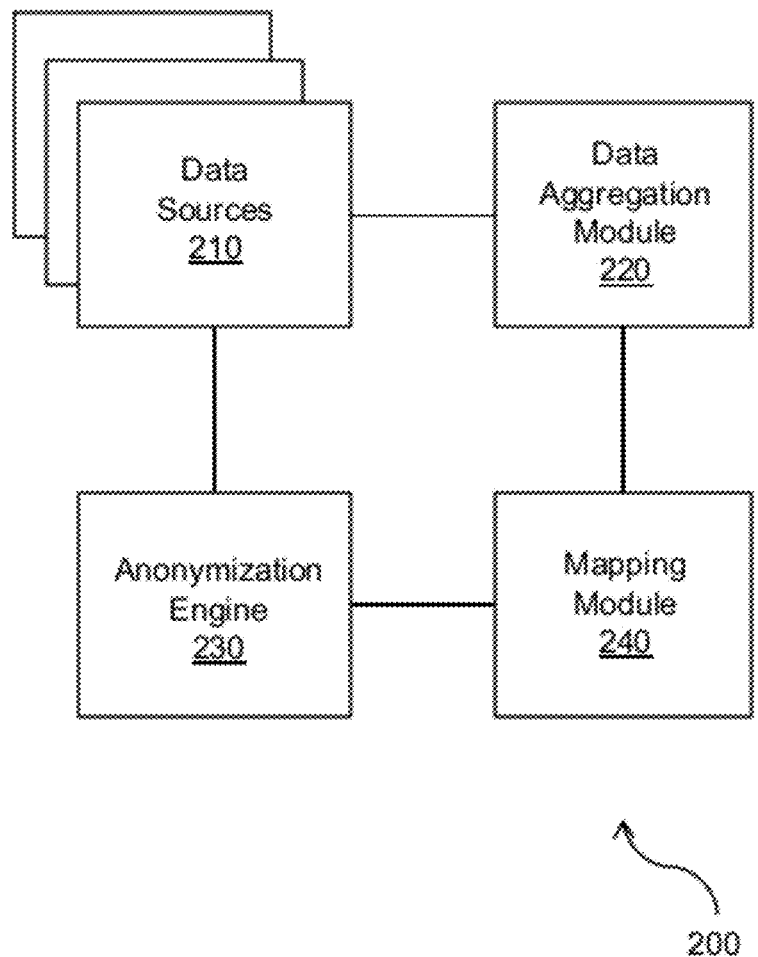
FIG. 2 is a diagram illustrating a system for anonymizing data from multiple data sources according to an embodiment of the invention.

FIG. 2 is a diagram illustrating a system 200 for anonymizing data from multiple data sources 210 according to an embodiment of the invention. The data sources 210 include record identifiers (also referred to herein as "personal identifiers"), wherein each record identifier identifies an entity associated with the data. As used herein, the term "entity" refers to an individual or groups of individuals, such as a corporation, a division within a corporation (e.g., accounting department), or government agency. The record identifiers are only stored in the data sources 210. The data (e.g., medical records) are collected by a central data aggregation module 220 connected to the data sources 210. As used herein, the term "connected" includes operationally connected, logically connected, in communication with, physically connected, engaged, coupled, contacts, linked, affixed, and attached. For example, in one embodiment of the invention, data (e.g., medical records) from multiple data sources (e.g., doctor A, doctor B, etc.) is anonymized, wherein the data is associated with personal identifiers (e.g., patients' names, social security numbers, etc.).

Figure 3:
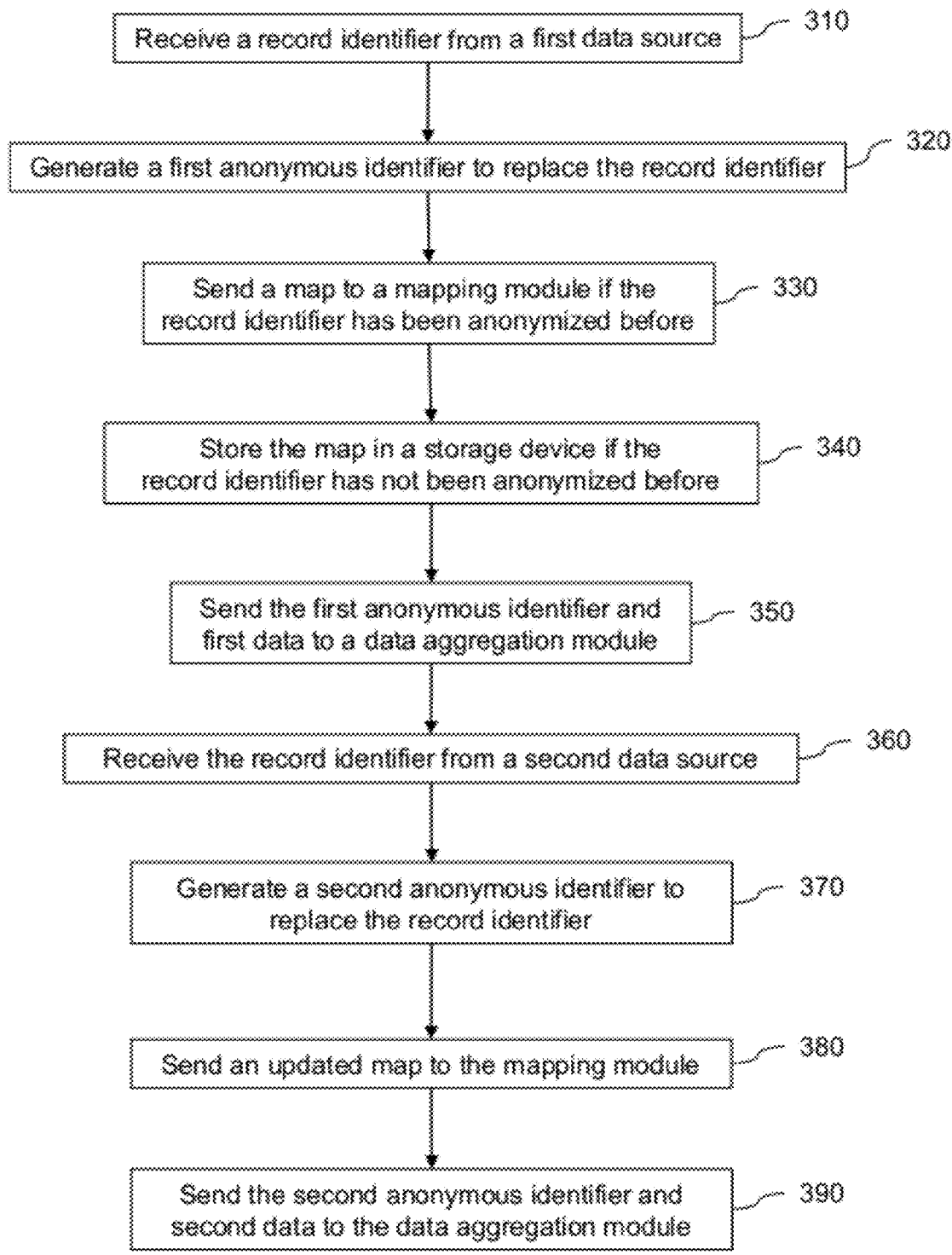
FIG. 3 is a flow diagram illustrating a method of anonymizing data coming from multiple data sources according to an embodiment of the invention.

FIG. 3 is a flow diagram illustrating a method of anonymizing data coming from multiple data sources according to an embodiment of the invention, for example, using the system 200. A record identifier from a first data source is received by an anonymization engine 230 (310), wherein the anonymization engine 230 generates a first anonymous identifier to replace the record identifier (320). For example, in one embodiment, the first data source sends first data (e.g., John Doe's medical records) and a record identifier (e.g., John Doe) to the anonymization engine 230, which generates a first anonymous identifier to replace the record identifier. In another embodiment, only the record identifier is sent to the anonymization engine 230. The anonymous identifier is generated with a salt and a key. Once the anonymous identifier is generated, it only includes the key, the salt is secret.

If the anonymization engine 230 has anonymized the record identifier before with a different salt-key pair, the anonymization engine 230 generates and sends a map to a mapping module 240 (330). The map includes a list of anonymous identifiers that have been used to replace the record identifier. The map does not include the record identifier; rather, the map provides a list of anonymous identifiers that all refer to the same entity. In at least one embodiment, if the anonymization engine 230 has not anonymized the record identifier before, the map is stored in a storage device that is either internal or external to anonymization engine 230 (340). In another embodiment, if the anonymization engine 230 has not anonymized the record identifier with the current salt-key pair, the anonymous hash is stored in a storage device that is either internal or external to the anonymization engine 230 and associated with the current salt-key pair. In this embodiment, if the anonymization engine 230 has anonymized the record identifier with the current salt-key pair, no further action is needed. The first anonymous identifier and first data associated with the first anonymous identifier are sent to the data aggregation module 220 (350). The first anonymous identifier and the first data are sent from the first data source or the anonymization engine 230.

The anonymizing engine 230 receives the record identifier from a second data source (360) and generates a second anonymous identifier to replace the record identifier (370). Thus, for example, Doctor 1 sends the record identifier "John Doe" to the anonymizing engine 230, which returns the anonymous identifier "123xyz"; and, Doctor 2 sends the record identifier "John Doe" to the anonymizing engine 230, which returns the anonymous identifier "456xyz". In at least one embodiment of the invention, the first and second anonymous identifiers are one-way non-reversible hashes, wherein the generating of the second anonymous identifier includes changing the salt and/or the key of the first anonymous identifier. If the anonymizing engine 230 has changed the salt-key combination, then the second anonymous identifier is different than the first anonymous identifier. If the anonymizing engine 230 is using the same salt-key combination, then the second anonymous identifier is the same as the first anonymous identifier.

The anonymizing engine 230 sends an updated map to the mapping module 240 (380), wherein the updated map includes an updated list of anonymous identifiers (e.g., including the first anonymous identifier and the second anonymous identifier) that have been used to replace the record identifier. In other words, the anonymizing engine 230 sends the mapping module 240 an updated list of anonymous identifiers that all refer to the same entity. Thus, in the example above, the updated map includes anonymous identifiers "123xyz" and "456xyz". In at least one embodiment, the updated map is only sent to the mapping module 240 when the salt and/or key of the first anonymous identifier is changed. In other words, if the anonymizing engine 230 is still using the same anonymous identifier for an individual (i.e., the salt or key has not changed), then an updated map is not sent to the mapping module 240.

The second anonymous identifier and second data associated with the second anonymous identifier are sent to the data aggregation module 220 (390). Specifically, the second anonymous identifier is sent from the second data source and/or the anonymization engine; and, the second data is sent from the second data source.

In at least one embodiment of the invention, the list and/or the updated list is provided to the data aggregation module 220 by the mapping module 240. Thus, the data aggregation module 220 can check the most up-to-date list to determine whether two or more anonymous identifiers are referring to the same entity (i.e., whether a key-salt combination has been changed by the anonymizing engine 230).

In another embodiment, the data aggregation module 220 sends the first data, the first anonymous identifier, the second data, and the second anonymous identifier to the mapping module 240. Based on the updated map, the mapping module 240 replaces the first anonymous identifier and the second anonymous identifier with the most recent anonymous identifier for the record identifier (i.e., either the first anonymous identifier, the second anonymous identifier, or other anonymous identifier—whichever anonymous identifier the anonymizing engine 230 has used most recently to replace the record identifier). The mapping module 240 sends the first data, the second data, and the most recent anonymous identifier to the data aggregation module.

Figure 4:
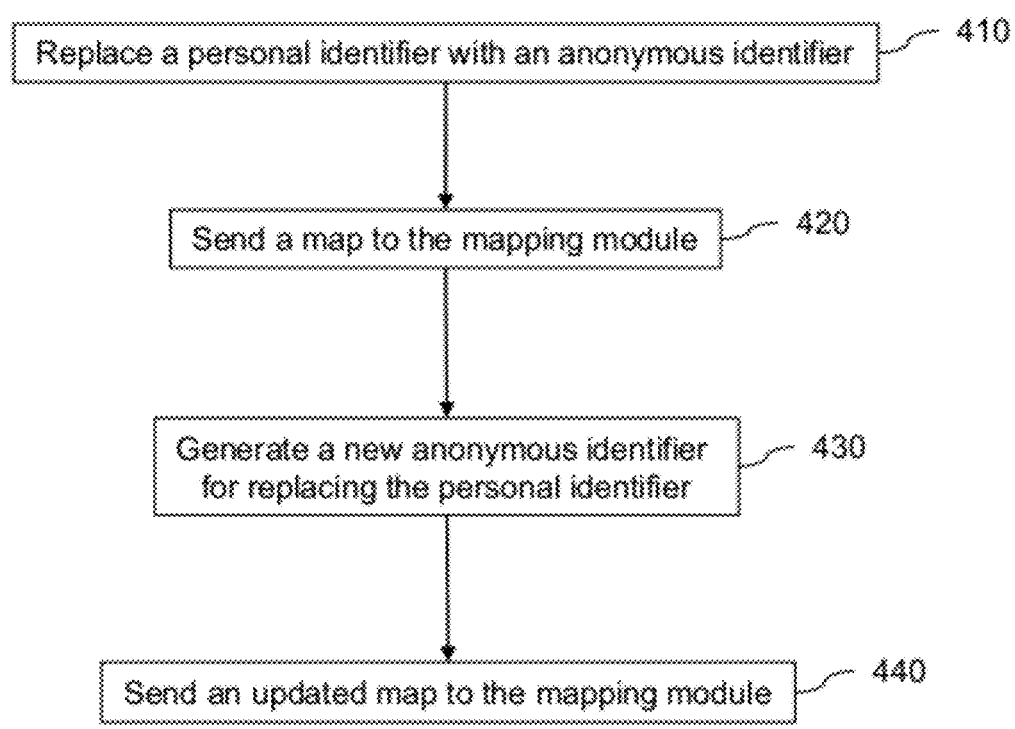
FIG. 4 is a flow diagram illustrating a method of anonymizing data coming from multiple data sources according to another embodiment of the invention.

FIG. 4 is a flow diagram illustrating a method of anonymizing data coming from multiple data sources according to another embodiment of the invention, for example, using the system 200. The data source(s) 210 include personal identifiers (also referred to herein as "record identifiers") that identify entities associated with the data. The data is collected by a central data aggregation module 220 connected to the at least one data source 210.

The anonymization engine 230 replaces a personal identifier with an anonymous identifier (410) and sends a map to the mapping module 240 (420). The map includes a list of anonymous identifiers that have been used to replace the personal identifier. The map does not include the personal identifier; rather, the map provides a list of anonymous identifiers that each refer to the same entity.

The anonymization engine 230 generates a new anonymous identifier for replacing the personal identifier (430). The anonymous identifiers are one-way non-reversible hashes that hide the identity of the entity associated with the data. In at least one embodiment, the anonymous identifier is generated by operating with a salt, key, and cryptographic hash operation; and, the generating of the new anonymous identifier changes the salt and/or the key. As described above, the salt and/or the key can be changed if there is a concern that the current secret has been compromised.

The anonymization engine 230 sends an updated map to the mapping module 240 (440). The updated map includes an updated list of anonymous identifiers that have been used to replace the personal identifier. Both the map and the updated map lack the personal identifier.

Figure 5:
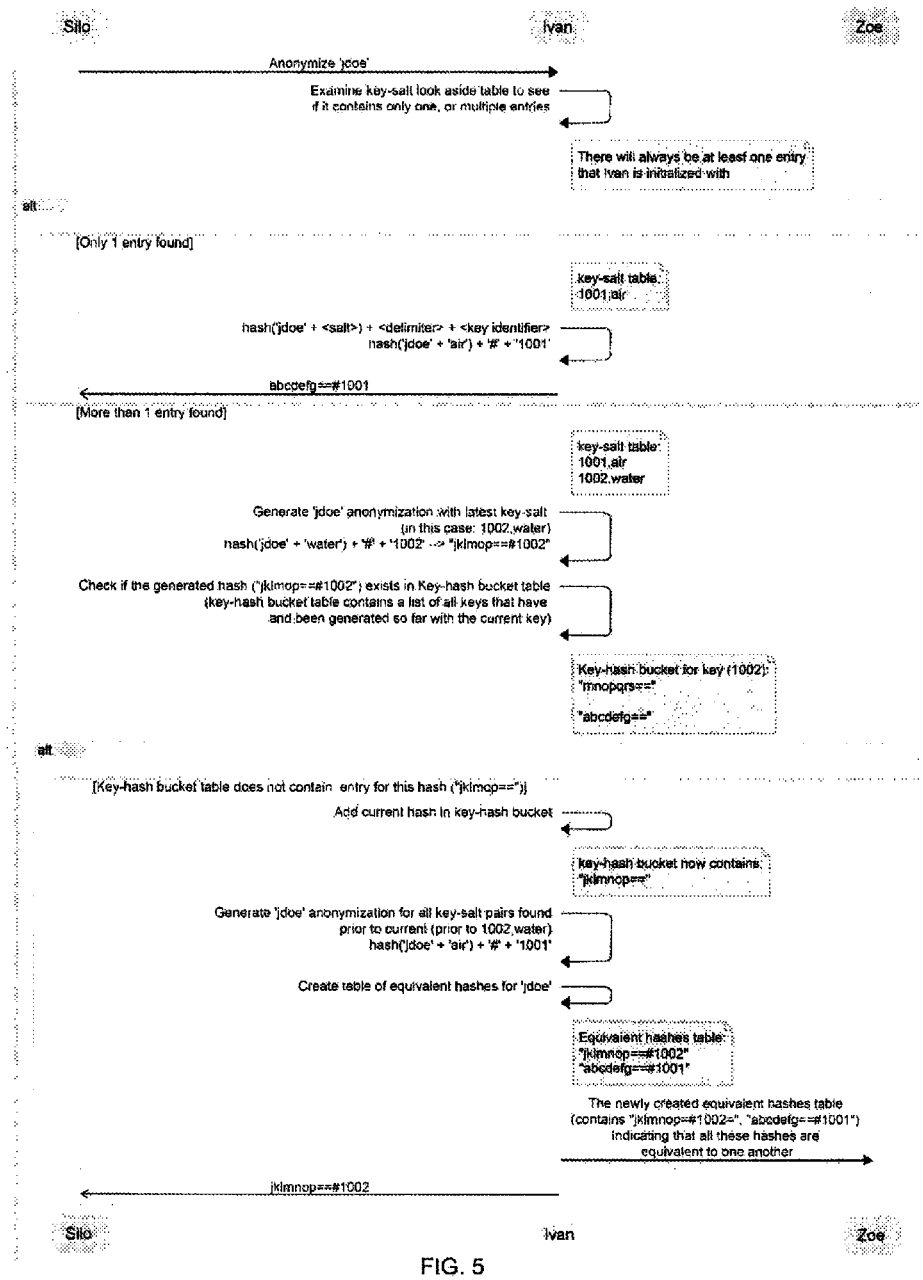
FIG. 5 illustrates a process flow for generating an anonymous identifier according to an embodiment of the invention.

FIG. 5 illustrates a process flow for generating an anonymous identifier (also referred to herein as a "hash") with example data according to an embodiment of the invention. A silo requests Ivan (also referred to herein as the "anonymization engine") to anonymize "jdoe". Ivan only finds one (1) entry in its key-salt look aside table for "jdoe". Using the key-salt combination of "1001, air", Ivan generates a first anonymous identifier (abcdefg==#1001) for "jdoe".

Using a new key-salt combination of "1002, water", Ivan generates a second anonymous identifier (jklmop==#1002) for "jdoe" and checks to see if the second anonymous identifier is in a key-hash bucket table. The key-hash bucket table contains a list of all the hashes that have been generated with the current key. For the key "1002", the hashes "mnopqrs==" and "abcdefg==" have been generated. The key-hash bucket table does not contain an entry for the hash "jklmop==".

The hash "jklmop==" is added to the key-hash bucket table and Ivan generates "jdoe" anonymization for all key-salt pairs found prior to the current key-salt combination of "1002, water". A table of equivalent hashes for "jdoe" is created, which now includes "abcdefg==#1001" and "jklmop==#1002".

Figure 6:
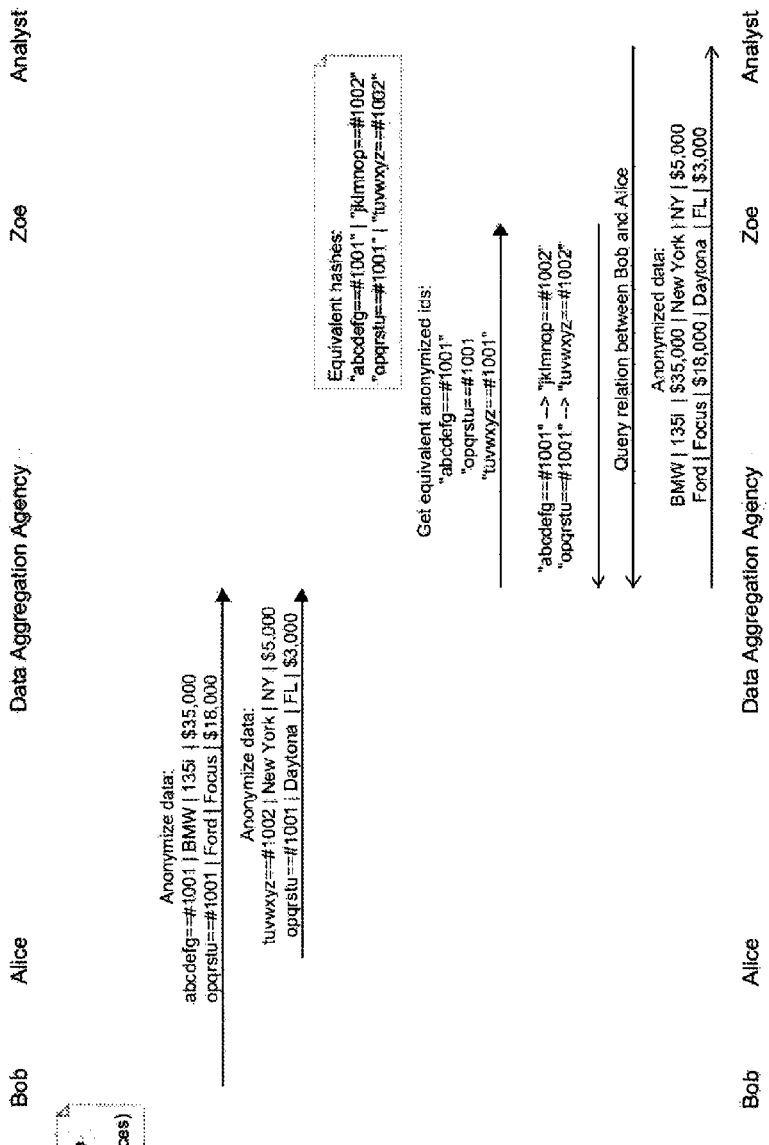
FIG. 6 illustrates a process flow for data aggregation according to an embodiment of the invention.

FIG. 6 illustrates a process flow for data aggregation according to an embodiment of the invention. Silos 1 and 2 (Bob and Alice) send four (4) anonymized data records to the Data Aggregation Agency: data record 1 (having anonymous identifier abcdefg==#1001), data record 2 (having anonymous identifier opqrstu==#1001), data record 3 (having anonymous identifier tuvwxyz==#1002), and data record 4 (having anonymous identifier opqrstu==#1001).

Zoe (also referred to herein as the "mapping module") has a list of equivalent hashes, which is sent to the Data Aggregation Agency. Thus, the Data Aggregation Agency is able to determine that data records 1 and 3 relate to the same entity, and that data records 2 and 4 relate to the same entity. When an Analyst queries the Data Aggregation Agency, the Data Aggregation Agency returns data records 1 and 3 together and data records 2 and 4 together. In at least one embodiment of the invention, instead of giving the list to the Data Aggregation Agency, Zoe performs the replacement (i.e., combines data records 1 and 3, and data records 2 and 4).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
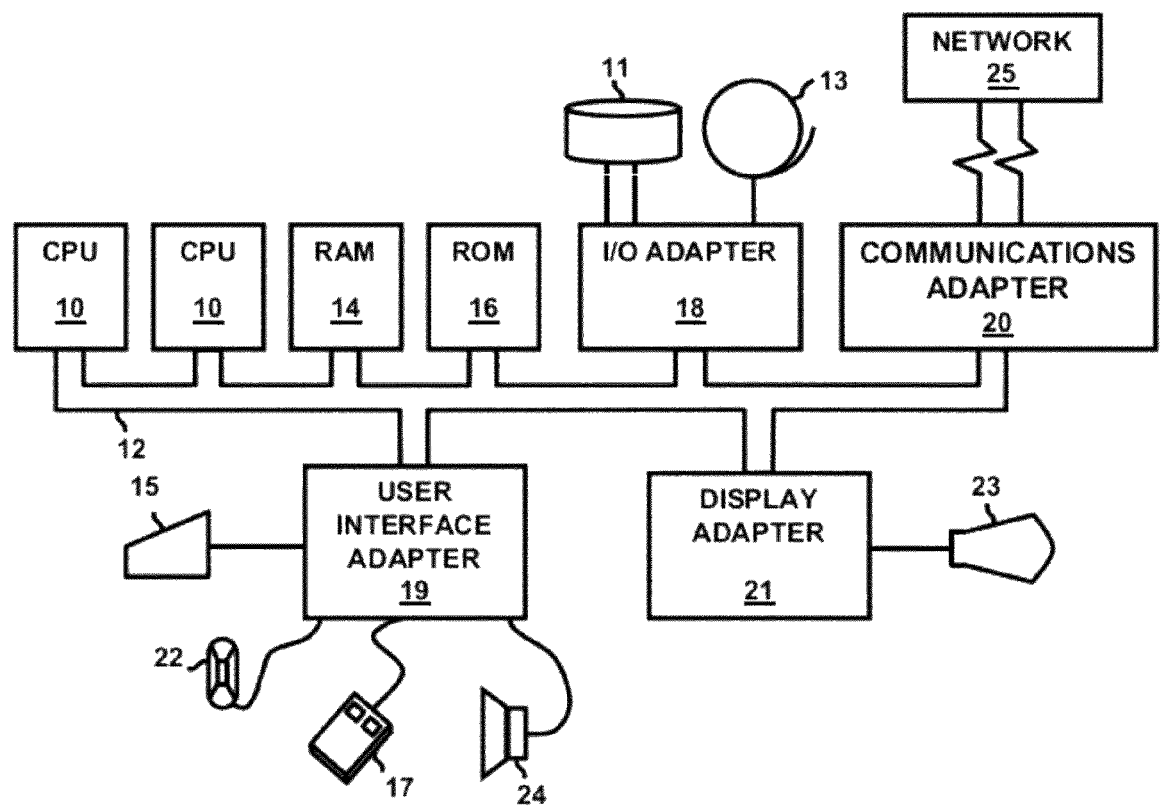
FIG. 7 illustrates a computer program product according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for anonymizing data from multiple data sources, the data sources comprising record identifiers identifying entities associated with the data, the record identifiers only being stored by the data sources, the data being collected by a central data aggregation module connected to the data sources, said method comprising:
    receiving a record identifier from a first data source, the record identifier being received by an anonymization engine;
    generating a first anonymous identifier to replace the record identifier with the anonymization engine, the first anonymous identifier being generated using a salt and a key;
    searching a key-hash bucket for the first anonymous identifier to determine whether the anonymization engine has anonymized the record identifier before, the key-hash bucket including:
        anonymous identifiers generated using the key, and
        the salt used with the key;
    sending the first anonymous identifier to the first data source when it is determined that the anonymization engine has anonymized the record identifier before;
    generating new anonymous identifiers with the anonymization engine when it is determined that the anonymization engine has not anonymized the record identifier before, the new anonymous identifiers being generated using key-salt combinations used previously by the anonymization engine;
    creating an equivalent hashes table for the record identifier, the equivalent hashes table including the first anonymous identifier and the new anonymous identifiers;
    sending the equivalent hashes table, the first anonymous identifier and first data associated with the first anonymous identifier to the data aggregation module;
    receiving the record identifier from a second data source, the record identifier being received by the anonymization engine;
    generating a second anonymous identifier to replace the record identifier with the anonymization engine, the second anonymous identifier being generated using a second salt and a second key, wherein both the first anonymous identifier and the second anonymous identifier are linked to the record identifier;
    searching a second key-hash bucket for the second anonymous identifier, the second key-hash bucket including:
        anonymous identifiers generated using the second key, and
        the second salt used with the second key;
    sending the second anonymous identifier to the second data source when the second anonymous identifier is found in the second key-hash bucket;
    generating second new anonymous identifiers with the anonymization engine when the second anonymous identifier is not found in the second key-hash bucket, the second new anonymous identifiers being generated using key-salt combinations used previously by the anonymization engine;
    creating a second equivalent hashes table for the record identifier, the second equivalent hashes table including the second anonymous identifier and the second new anonymous identifiers; and
    sending the second equivalent hashes table, the second anonymous identifier and second data associated with the second anonymous identifier to the data aggregation module.

2. The method according to claim 1, further comprising: receiving the first data, the first anonymous identifier, the second data, and the second anonymous identifier in the mapping module; replacing the first anonymous identifier and the second anonymous identifier with a most recent anonymous identifier for the record identifier based on the second equivalent hashes table; and sending the first data, the second data, and the most recent anonymous identifier to the data aggregation module.

3. The method according to claim 1, wherein said generating of the second anonymous identifier comprises changing the salt and the key.

4. The method according to claim 1, wherein the second equivalent hashes table is only sent to the mapping module when at least one of the first salt and the first key is changed.

5. The method according to claim 1, wherein the record identifier identifies an entity associated with the first data and the second data, and wherein the first and second anonymous identifiers hide the identity of the entity associated with the first and second data.

6. The method according to claim 1, wherein the anonymous identifier comprises a one-way non-reversible hash.

7. A method for anonymizing data from multiple data sources, the data sources comprising personal identifiers identifying entities associated with the data, the data being collected by a central data aggregation module connected to the data sources, said method comprising:
- replacing a personal identifier with an anonymous identifier using an anonymization engine, wherein said replacing of the personal identifier with the anonymous identifier comprises generating the first anonymous identifier with a salt and a key;
- searching a key-hash bucket for the first anonymous identifier to determine whether the anonymization engine has anonymized the personal identifier before, the key-hash bucket including:
  - anonymous identifiers generated using the key, and
  - the salt used with the key;
- sending the first anonymous identifier to the first data source when it is determined that the anonymization engine has anonymized the personal identifier before;
- generating new anonymous identifiers with the anonymization engine when it is determined that the anonymization engine has not anonymized the personal identifier before, the new anonymous identifiers being generated using key-salt combinations used previously by the anonymization engine;
- creating an equivalent hashes table for the personal identifier, the equivalent hashes table including the first anonymous identifier and the new anonymous identifiers;
- receiving the record identifier from a second data source, the record identifier being received by the anonymization engine;
- generating a second anonymous identifier to replace the record identifier with the anonymization engine, the second anonymous identifier being generated using a second salt and a second key, wherein both the first anonymous identifier and the second anonymous identifier are linked to the record identifier;
- searching a second key-hash bucket for the second anonymous identifier, the second key-hash bucket including:
  - anonymous identifiers generated using the second key, and
  - the second salt used with the second key;
- sending the second anonymous identifier to the second data source when the second anonymous identifier is found in the second key-hash bucket;
- generating second new anonymous identifiers with the anonymization engine when the second anonymous identifier is not found in the second key-hash bucket, the second new anonymous identifiers being generated using key-salt combinations used previously by the anonymization engine;
- creating a second equivalent hashes table for the record identifier, the second equivalent hashes table including the second anonymous identifier and the second new anonymous identifiers; and
- sending the second equivalent hashes table, the second anonymous identifier and second data associated with the second anonymous identifier to the data aggregation module.

8. The method according to claim 7, wherein the personal identifier identifies an entity associated with the data, and wherein the anonymous identifier and the new anonymous identifier each hide an identity of the entity associated with the data.

9. The method according to claim 7, wherein the anonymous identifier comprises a one-way non-reversible hash.

10. A system for anonymizing data from multiple data sources, the data sources comprising personal identifiers identifying entities associated with the data, said system comprising:
- a processor;
- a central data aggregation module connected to the data sources, said central data aggregation module collects the data;
- an anonymization engine, said anonymization engine:
- generates a first anonymous identifier to replace the record identifier, the first anonymous identifier being generated using a salt and a key,
- searches a key-hash bucket for the first anonymous identifier to determine whether said anonymization engine has anonymized the record identifier before, the key-hash bucket including:
  - anonymous identifiers generated using the key, and
  - the salt used with the key,
- sends the first anonymous identifier to the first data source when it is determined that said anonymization engine has anonymized the record identifier before,
- generates new anonymous identifiers when it is determined that said anonymization engine has not anonymized the record identifier before, the new anonymous identifiers being generated using key-salt combinations used previously by said anonymization engine, and
- creates an equivalent hashes table for the record identifier, the equivalent hashes table including the first anonymous identifier and the new anonymous identifiers;
- a mapping module connected to said anonymization engine and the data aggregation module, said mapping module provides the equivalent hashes table, the first anonymous identifier and first data associated with the first anonymous identifier to the data aggregation module;
- said anonymization engine:
- receives the record identifier from a second data source;
- generates a second anonymous identifier to replace the record identifier with the anonymization engine, the second anonymous identifier being generated using a second salt and a second key, wherein both the first anonymous identifier and the second anonymous identifier are linked to the record identifier;
- searches a second key-hash bucket for the second anonymous identifier, the second key-hash bucket including:
  - anonymous identifiers generated using the second key, and
  - the second salt used with the second key;
- sends the second anonymous identifier to the second data source when the second anonymous identifier is found in the second key-hash bucket;
- generating second new anonymous identifiers with the anonymization engine when the second anonymous identifier is not found in the second key-hash bucket, the second new anonymous identifiers being generated using key-salt combinations used previously by the anonymization engine;

creates a second equivalent hashes table for the record identifier, the second equivalent hashes table including the second anonymous identifier and the second new anonymous identifiers; and sends the second equivalent hashes table, the second anonymous identifier and second data associated with the second anonymous identifier to the data aggregation module.

11. The system according to claim 10, wherein the personal identifier identifies an entity associated with first data, and wherein the anonymous identifier and the new anonymous identifier hides an identity of the entity associated with the data.

12. The system according to claim 10, wherein the anonymous identifier and the new anonymous identifier each comprise a one-way non-reversible hash.

13. The system according to claim 10, wherein the personal identifiers are only stored in the data sources.

14. The system according to claim 10, wherein the data sources send the data to the data aggregation module.

15. A computer program product for anonymizing data from multiple data sources, the data sources comprising personal identifiers identifying entities associated with the data, the data being collected by a central data aggregation module connected to the data sources, said computer program product comprising:

a non-transitory computer readable storage medium;

first program instructions to replace a personal identifier with an anonymous identifier said first program instructions generate the first anonymous identifier with a salt and a key;

second program instructions to search a key-hash bucket for the first anonymous identifier to determine whether an anonymization engine has anonymized the personal identifier before, the key-hash bucket including:
anonymous identifiers generated using the key, and
the salt used with the key;

third program instructions to send the first anonymous identifier to the first data source when it is determined that the anonymization engine has anonymized the personal identifier before;

fourth program instructions to generate new anonymous identifiers when it is determined that the anonymization engine has not anonymized the personal identifier before, the new anonymous identifiers being generated using key-salt combinations used previously by the anonymization engine;

fifth program instructions to create an equivalent hashes table for the personal identifier, the equivalent hashes table including the first anonymous identifier and the new anonymous identifiers;

sixth program instructions to receive the record identifier from a second data source, the record identifier being received by the anonymization engine;

seventh program instructions to generate a second anonymous identifier to replace the record identifier with the anonymization engine, the second anonymous identifier being generated using a second salt and a second key, wherein both the first anonymous identifier and the second anonymous identifier are linked to the record identifier;

eighth program instructions to search a second key-hash bucket for the second anonymous identifier, the second key-hash bucket including:
anonymous identifiers generated using the second key, and
the second salt used with the second key;

ninth program instructions send the second anonymous identifier to the second data source when the second anonymous identifier is found in the second key-hash bucket;

tenth program instructions generate second new anonymous identifiers with the anonymization engine when the second anonymous identifier is not found in the second key-hash bucket, the second new anonymous identifiers being generated using key-salt combinations used previously by the anonymization engine;

eleventh program instructions create a second equivalent hashes table for the record identifier, the second equivalent hashes table including the second anonymous identifier and the second new anonymous identifiers; and twelfth program instructions send the second equivalent hashes table, the second anonymous identifier and second data associated with the second anonymous identifier to the data aggregation module, said first program instructions, said second program instructions, said third program instructions, and said fourth program instructions, and said fifth program instructions, and said sixth program instructions, and said seventh program instructions, and said eighth program instructions, and said ninth program instructions, and said tenth program instructions, and said eleventh program instructions, and said twelfth program instructions are stored on said computer readable storage medium.

16. The computer program product according to claim 15, further comprising sixth program instructions to:
receive the first data, the first anonymous identifier, the second data, and the second anonymous identifier in the mapping module;
replace the first anonymous identifier and the second anonymous identifier with a most recent anonymous identifier for the record identifier based on the updated map; and
send the first data, the second data, and the most recent anonymous identifier to the data aggregation module.

17. The computer program product according to claim 15, wherein the anonymous identifier comprises a one-way non-reversible hash.

* * * * *